(12) United States Patent
Oh (10) Patent No.: US 7,490,188 B2
(45) Date of Patent: Feb. 10, 2009

(54) APPARATUS AND METHOD FOR USB DATA TRANSMISSION IN HYBRID TERMINAL INCLUDING TWO CPUS UTILIZING TWO MEMORIES

(75) Inventor: Hyuk Oh, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 350 days.

(21) Appl. No.: 11/345,712

(22) Filed: Feb. 2, 2006

(65) Prior Publication Data

US 2006/0174043 A1     Aug. 3, 2006

(30) Foreign Application Priority Data

Feb. 2, 2005      (KR)      ............... 10-2005-0009716

(51) Int. Cl.
*G06F 13/20*      (2006.01)

(52) U.S. Cl. .................. 710/313; 710/33; 710/110; 710/106; 710/74; 710/62

(58) Field of Classification Search ......... 710/313–316, 710/62–64, 72–74, 1–2, 106–110, 32–35; 709/211–216

See application file for complete search history.

(56) References Cited

U.S. PATENT DOCUMENTS

| 6,618,788 | B1* | 9/2003 | Jacobs ..................... 710/315 |
| 6,944,700 | B2* | 9/2005 | Bateman et al. ............. 710/300 |
| 2002/0093583 | A1* | 7/2002 | Ito ............................. 348/373 |
| 2004/0104757 | A1* | 6/2004 | Vargas ....................... 327/334 |
| 2004/0128371 | A1* | 7/2004 | Park et al. .................. 709/221 |
| 2005/0223145 | A1* | 10/2005 | Lin et al. ..................... 710/62 |
| 2006/0041689 | A1* | 2/2006 | Fujita et al. .................. 710/2 |
| 2007/0079019 | A1* | 4/2007 | Hu et al. ...................... 710/36 |

* cited by examiner

*Primary Examiner*—Raymond N Phan
(74) *Attorney, Agent, or Firm*—The Farrell Law Firm, PC (57) ABSTRACT

An apparatus and a method for sharing an USB port and transmitting data in a hybrid terminal including both two CPUs and memories corresponding to the two CPUs are disclosed. In the apparatus and the method, an external apparatus, for which the hybrid terminal performs USB data transmission/reception, recognizes the two memories as two removable disks, and the hybrid terminal classifies the two memories and stores/reads data according to the request of the external apparatus, so that it is possible to efficiently use the memories of the hybrid terminal.

9 Claims, 6 Drawing Sheets

APPARATUS AND METHOD FOR USB DATA TRANSMISSION IN HYBRID TERMINAL INCLUDING TWO CPUS UTILIZING TWO MEMORIES

PRIORITY

This application claims priority to an application entitled "Apparatus and Method for USB Data Transmission In Hybrid Terminal Including Two CPUs" filed in the Korean Intellectual Property Office on Feb. 2, 2005 and assigned Serial No. 2005-9716, the contents of which are incorporated herein by reference.

BACKGROUND OF THE INVENTION

1. Field of the Invention

The present invention relates to data transmission using a Universal Serial Bus (USB) port, and more particularly to an apparatus and a method for sharing an USB port and transmitting data in a hybrid terminal including two Central Processing Units (CPUs) and memories corresponding to the two CPUs.

2. Description of the Related Art

With the popularization of mobile communication terminals and the various demands of users, mobile communication terminals have come to include various supplementary functions in addition to a basic communication function. For example, the supplementary functions may include various functions such as a camera function, a play function of a music file including a Moving Picture experts group layer 3 (MP3), a dynamic image play function, a position tracking function associated with a Global Positioning System (GPS), and a Personal Digital Assistant (PDA). A mobile communication terminal including the supplementary functions has two CPUs. In a mobile communication terminal (hybrid terminal) usually including two CPUs, one CPU controls a series of operations relating to wireless communication, and the other CPU controls a series of operations relating to the supplementary functions in addition to wireless communication. Further, the hybrid terminal includes memories corresponding to each CPU and supports control operations of each CPU.

In the meantime, as mobile communication terminals are constructed so as to exchange USB data with an external apparatus, the mobile communication terminals include USB ports, USB input/output units, and USB Mass Storages (UMSs). If such a mobile communication terminal is connected to a computer, etc., through a USB data transmission cable, the computer recognizes a memory included in the mobile communication terminal as a removable disk, and transmits data to the mobile communication terminal or reads data stored in the mobile communication terminal. Such a USB function allows a user to easily download data relating to functions of the mobile communication terminal and to use the memory of the mobile communication terminal as a removable disk.

However, because a mobile communication terminal is manufactured in a small size in order to ensure portability, it usually has only one USB port. Likewise, the hybrid terminal also has only one USB port. Accordingly, in the case of the hybrid terminal, one of two CPUs can perform data transmission/reception through the USB port, but the other CPU cannot use the USB port. Even when each of the two CPUs support a USB function, the two CPUs cannot perform the USB function because the hybrid terminal does not have two USB ports due to its small size, which is required for portability. Therefore, in the case of the hybrid terminal, a memory of a CPU, which cannot perform USB data communication due to non-assignment of a USB port, has a low degree of utilization, as compared with a memory of the CPU which can perform USB data communication through connection of the USB port. In other words, the overall efficiency of using the memory of the hybrid terminal may deteriorate.

SUMMARY OF THE INVENTION

Accordingly, the present invention has been made to solve the above-mentioned problems occurring in the prior art, and it is an object of the present invention to provide an apparatus and a method for USB data transmission, in which two CPUs of a hybrid terminal can perform USB data communication.

It is another object of the present invention to provide an apparatus and a method for USB data transmission, which can improve the efficiency of using a memory of a hybrid terminal including two CPUs.

In order to accomplish the aforementioned objects, according to one aspect of the present, there is provided a method for USB data transmission in a hybrid terminal, the hybrid terminal including a first Central Processing Unit (CPU), a second CPU, a first independent memory, a second independent memory, and a Universal Serial Bus (USB) port, the first memory and the second memory corresponding to the first CPU and the second CPU, respectively, the method comprising when the first CPU detects connection with an external apparatus through the USB port, transmitting information for classifying the first memory and the second memory by the first CPU to the external apparatus; analyzing by the first CPU data received through the USB port, and storing data in the first memory or reading data stored in the first memory and transmitting the read data to the external apparatus through the USB port according to information included in the data when a detected target memory corresponds to the first memory; and when the target memory corresponds to the second memory, transmitting by the first CPU the information included in the data to the second CPU, and storing by the second CPU the stored data in the second memory or reading data stored in the second memory and transmitting the read data to the external apparatus through the first CPU and the USB port according to the information included in the data.

In order to accomplish the aforementioned objects, according to another aspect of the present, there is provided an apparatus for USB data transmission in a hybrid terminal, the hybrid terminal including a Universal Serial Bus (USB) port, a first Central Processing Unit (CPU), a second CPU, a first memory, and a second memory, the first memory and the second memory corresponding to the two CPUs, respectively, the apparatus including the first CPU for detecting connection with an external apparatus through the USB port, transmitting information for classifying the first memory and the second memory to the external apparatus, analyzing data received through the USB port, storing data in the first memory or reading data stored in the first memory and transmitting the read data to the external apparatus through the USB port according to information included in the data when a detected target memory corresponds to the first memory, and outputting the data to the second CPU and transmitting read data input from the second CPU to the external apparatus through the USB port when the target memory corresponds to the second memory; and the second CPU for storing the stored data in the second memory or reading data stored in the second memory and outputting the read data to the first CPU according to the information included in the data.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment according to the present invention will be described with reference to the accompanying drawings.

Figure 1:
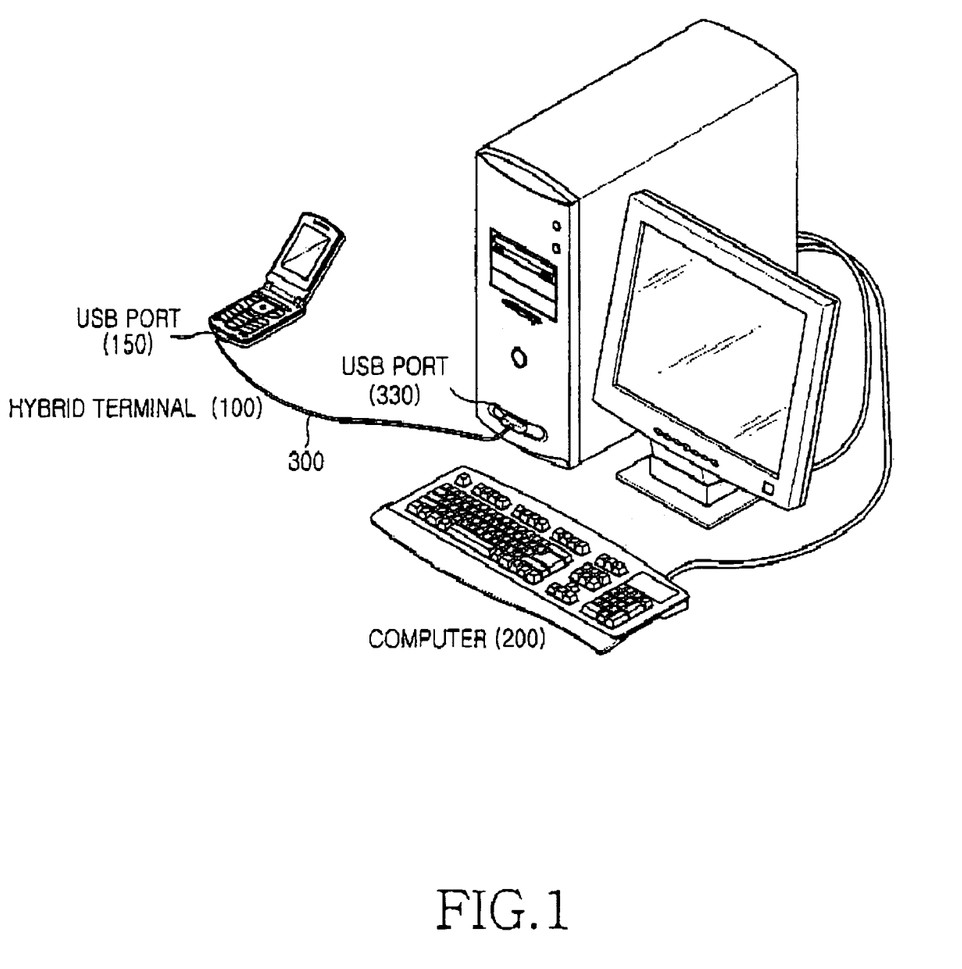
FIG. 1 illustrates a connection status between a computer and a mobile communication terminal (hybrid terminal) including two CPUs according to the present invention.

FIG. 1 illustrates a connection status between a mobile communication terminal (hybrid terminal) including two Central Processing Units (CPUs) and an external apparatus according to the present invention. It is assumed that the external apparatus is a computer according to an embodiment of the present invention. As illustrated in FIG. 1, the hybrid terminal 100 and the computer 200 are connected through both Universal Serial Bus (USB) ports 150 and 330, which are respectively installed at the hybrid terminal 100 and the computer 200, and a USB data transmission cable 300. The hybrid terminal 100 is connected to the computer 200 through the USB ports 150 and 330, but the computer 200 recognizes two memories included in the hybrid terminal 100 as two removable disks according to the present invention, and stores data in the two removable disks or reads data stored in the two removable disks according to the user selection.

Figure 2:
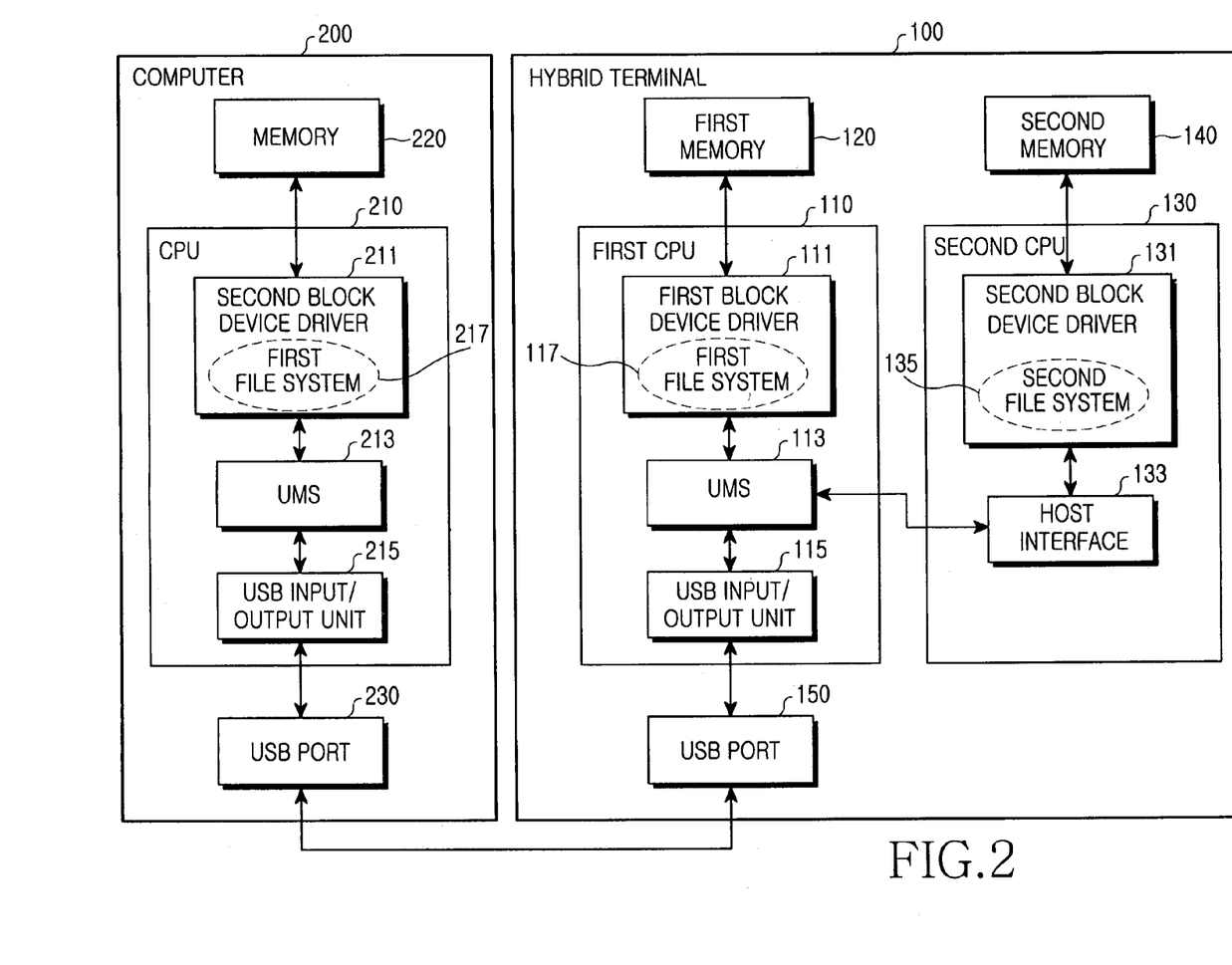
FIG. 2 is a block diagram illustrating the constructions of a computer and a hybrid terminal according to the present invention

FIG. 2 is a block diagram illustrating the constructions of the computer 200 and the hybrid terminal 100 according to the present invention.

Referring to FIG. 2, the hybrid terminal 100 includes a first CPU 110, a first memory 120, a second CPU 130, a second memory 140 and a USB port 150. The first CPU 110 includes a first block device driver 111, a common USB Mass Storage (UMS) 113 and a USB input/output unit 115, and the second CPU 130 includes a second block device driver 131 and a host interface 133. The computer 200 includes a CPU 210, a memory 220 and a USB port 230. The CPU 210 includes a block device driver 211, a UMS 213 and a USB input/output unit 215.

Hereinafter, the construction of the hybrid terminal 100 will be described. The first memory 120 and the second memory 140 respectively store programs for processing and control of the first and the second CPUs 110 and 130, reference data, and various renewable storage data, and function as working memories of the CPUs 110 and 130, respectively.

A first file system 117 of the first CPU 110 reads data on a file basis, which are stored in the first memory 120, through the first block device driver 111 according to read sector numbers and the number of read sectors. Further, the first file system 117 receives storage sector numbers, the number of storage sectors, and storage data from the common UMS 113, and stores data in the first memory 120 according to the storage sector numbers and the number of storage sectors. Likewise, a second file system 135 of the second CPU 130 reads data on a file basis, which are stored in the second memory 140, according to read sector numbers and the number of read sectors. Further, the second file system 135 receives storage sector numbers, storage sector information, and storage data from the host interface 133, and stores data in the second memory 140 according to the sector numbers and the sector information. Each of the first file system 117 and the second file system 135 corresponds to a program capable of managing data by the file.

The host interface 133 of the second CPU 130 represents an interface between the first CPU 110 and the second CPU 130, outputs data input from the second block device driver 131 to the common UMS 113, and outputs data input from the common UMS 113 to the second block device driver 131.

The common UMS 113 of the first CPU 110 classifies data input from the first block device driver 111 or the host interface 133 into sector numbers, sector information and data, generates a transmittable UMS packet, and outputs the UMS packet to the USB input/output unit 115. The common UMS 113 analyzes a UMS packet input from the USB input/output unit 115 so as to detect information of a target memory, determines if the input UMS packet relates to the first memory 120 or the second memory 140, extracts a storage/read request message, storage/read sector numbers, the number of storage/read sectors, storage data, etc., and transmits the determination results to the first block device driver 111 or the host interface 133 according to the determination results of the target memory. Further, if the common UMS 113 detects that the common UMS 113 is connected to the computer 200 through the USB data transmission cable 300, the common UMS 113 transmits memory classification information to the computer 200 through the USB input/output unit 115, the USB port 150, and the USB data transmission cable 300. The memory classification information represents information regarding two independent storage areas formed by the first memory 120 and the second memory 140, and allows the computer 200 having received the memory classification information to determine the hybrid terminal 100 as two removable disks.

The USB input/output unit 115 of the first CPU 110 transmits data input through the connected USB port 150 to the common UMS 113, and transmits data received from the common UMS 113 to the USB port 150.

The USB port 150 represents a port to which the USB data transmission cable 300 is directly connected, and is used when data are exchanged between the connected USB input/output unit 115 and the USB port 230.

Further, the memory 220, the USB port 230, the block device driver 211 and the USB input/output unit 215 of the computer 200 perform operations similar to those of the first and the second memories 120 and 140, the USB port 150, the first and the second block device drivers 111 and 131, and the USB input/output unit 115, respectively. The UMS 213 classifies data on a file basis input from the block device driver 211 into sector numbers, sector information and data, generates a transmittable UMS packet, and outputs the UMS packet to the USB input/output unit 215, and likewise analyzes a UMS packet input from the USB input/output unit 215 so as to extract sector numbers, sector information and data, and outputs the extracted sector numbers, sector information and data to the block device driver 211.

Hereinafter, a data transmission process using the USB between the hybrid terminal 100 and the computer 200 having the constructions as described above will be described. If both the computer 200 and the hybrid terminal 100 detect that they are connected through the USB data transmission cable 300, the common UMS 113 of the hybrid terminal 100 transmits the memory classification information to the computer 200. The CPU 210 of the computer 200 receives the memory classification information, recognizes the hybrid terminal 100 as two removable disks, and displays a message for guiding the determination result. Then, the CPU 210 of the computer 200 transmits storage data to each removable disk in the form of a UMS packet according to user input, or requests reading of data stored in each removable disk. The common UMS 113 of the hybrid terminal 100 analyzes a UMS packet received from the computer 200, determines if the UMS packet relates to the first memory 120 or the second memory 140 according to target memory information, extracts a storage request message and a read request message, and determines if the packet is a packet to be stored in each memory or a packet for requesting data from one of the two memories. Then, the common UMS 113 extracts storage/read sector numbers, the number of storage/read sectors, and data to be stored in the case of the storage UMS packet, and transmits the extraction results to the first block device driver 111 or the host interface 133 according to the target memory information together with the storage request message or the read request message.

If the storage request message, the storage sector numbers, the number of storage sectors, and the storage data are input, the first block device driver 111 stores the storage data in the first memory 120 according to the storage sector numbers and the number of storage sectors. If the read request message, the read sector numbers, and the number of read sectors are input, the first block device driver 111 reads the data stored in the first memory 120 according to the read sector numbers and the number of read sectors, and outputs the read data to the common UMS 113.

The host interface 133 outputs the storage request message or the read request message, the storage data, the storage/read sector numbers, and the number of storage/read sectors to the second block device driver 131. If the storage request message, the storage sector numbers, the number of storage sectors, and the storage data are input, the second block device driver 131 stores the data in the second memory 140 according to the storage sector numbers and the number of storage sectors. If the read request message, the read sector numbers, and the number of read sectors are input, the second block device driver 131 reads the data stored in the second memory 140 according to the read sector numbers and the number of read sectors, and outputs the read data to the common UMS 113 through the host interface 133.

The common UMS 113 classifies the read data input from the first block device driver 111 or the host interface 133 into sector numbers, sector information and data, generates a transmittable UMS packet, and outputs the UMS packet to the computer 200 through the USB input/output unit 115 and the USB port 150.

Figure 3:
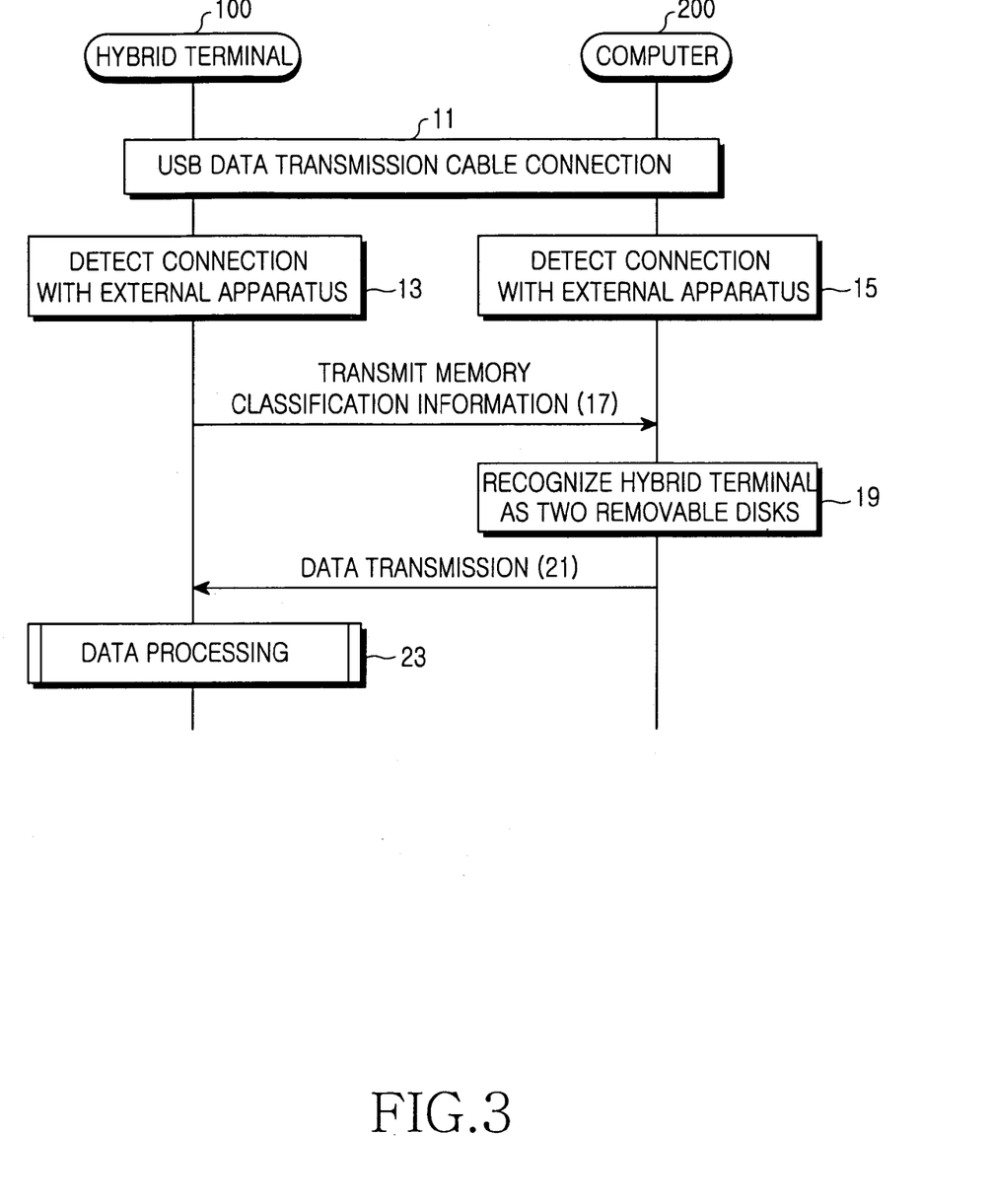
FIG. 3 is a flow diagram illustrating an operation process based on a USB connection between a computer and a hybrid terminal according to the present invention.
Figure 4:
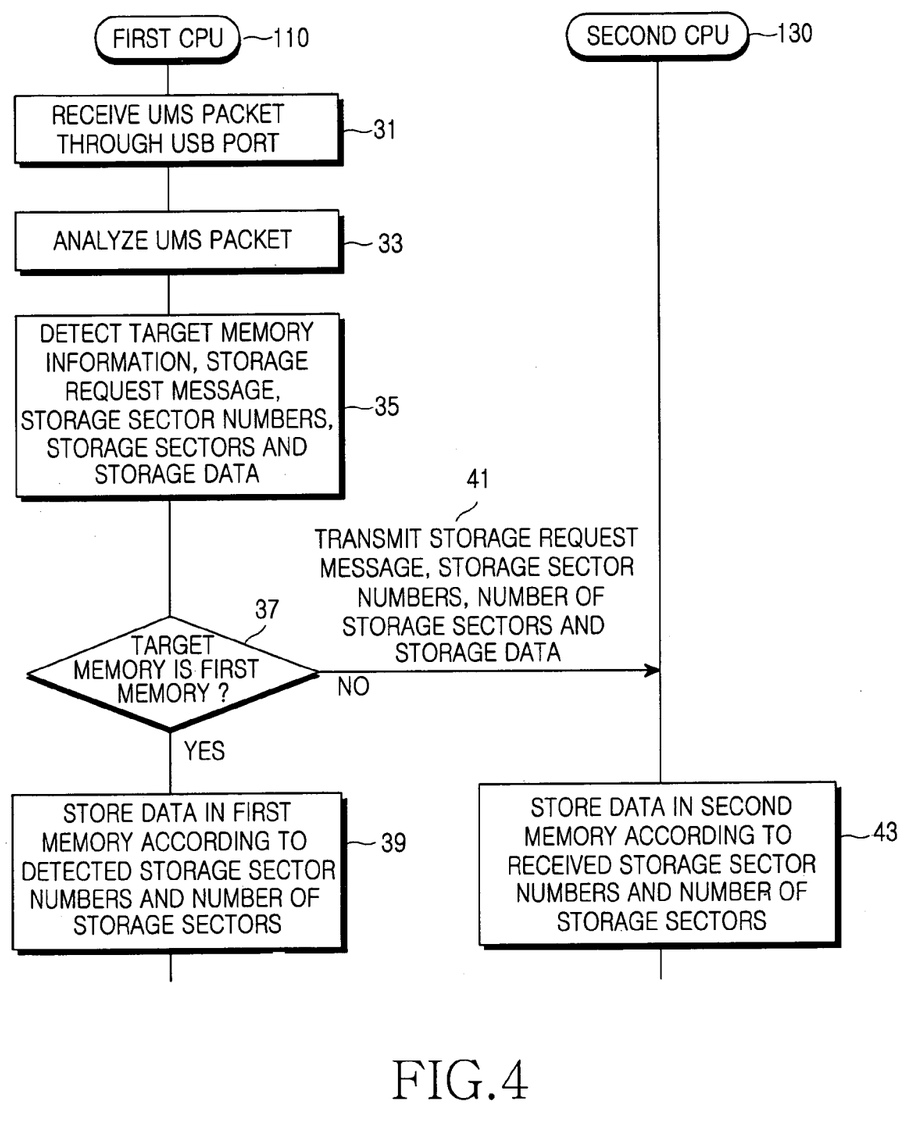
FIG. 4 is a flow diagram illustrating an operation of a hybrid terminal for storing data received through a USB port according to the present invention.
Figure 5:
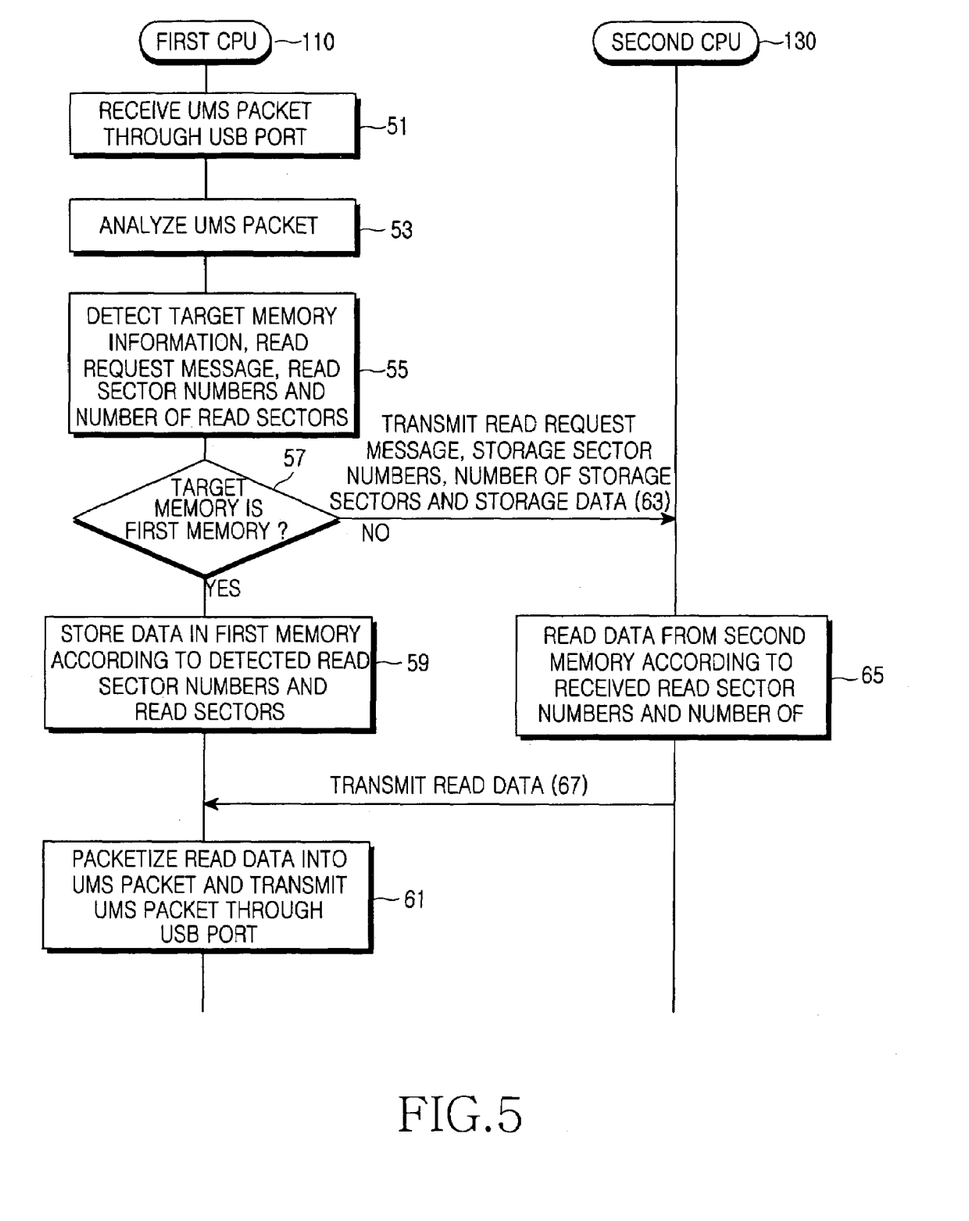
FIG. 5 is a flow diagram illustrating an operation of a hybrid terminal for transmitting data to a computer through a USB port according to the present invention.
Figure 6:
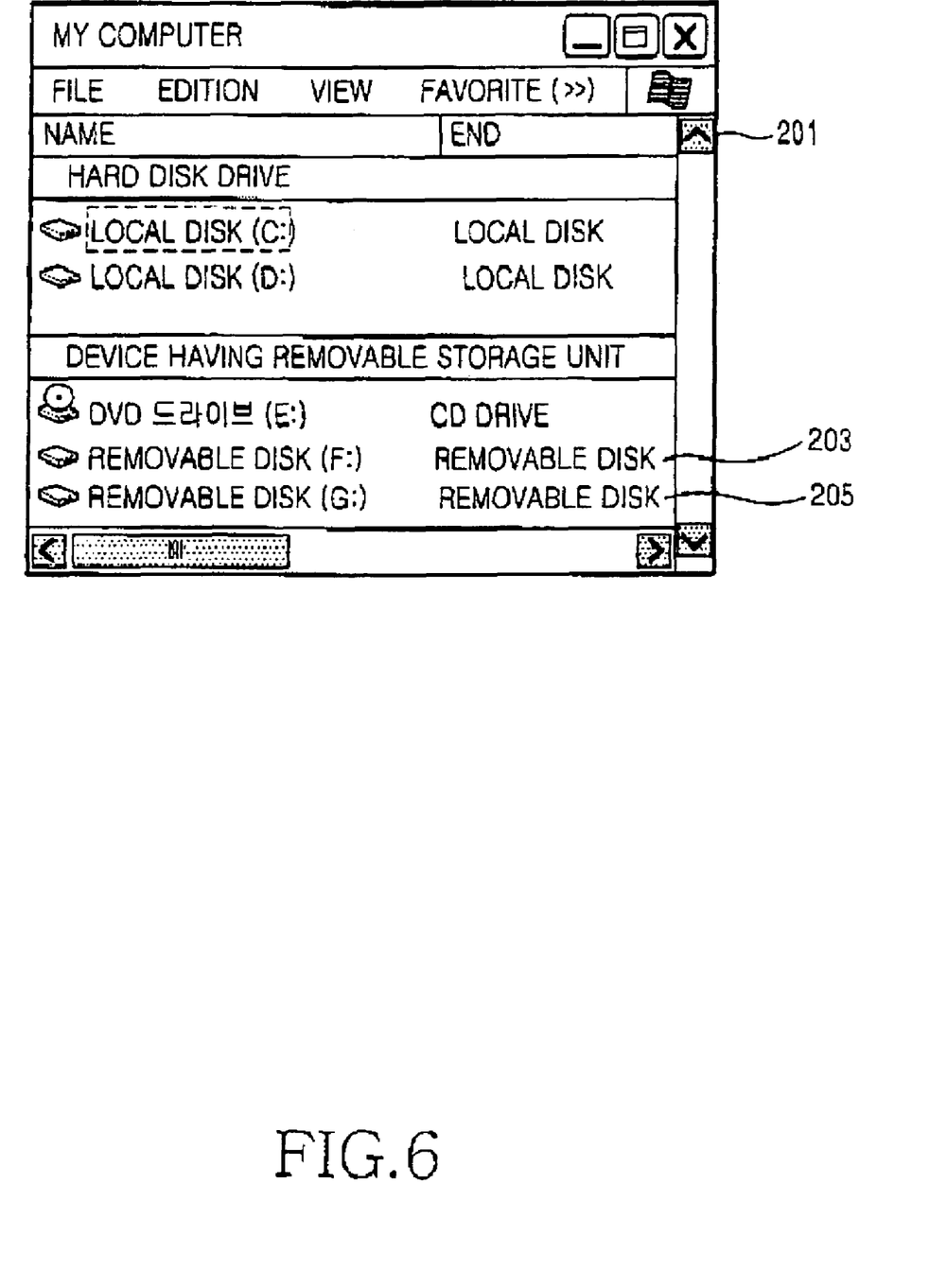
FIG. 6 illustrates a guidance screen displayed on a computer according to the present invention.

The previously described process is illustrated in FIGS. 3 to 6. Hereinafter, a process in which the computer 200 recognizes the hybrid terminal 100 as two removable disks after the hybrid terminal 100 is connected to the computer 200 through the USB data transmission cable 300 will be described. FIG. 3 is a flow diagram illustrating an operation process based on USB connection between the computer 200 and the hybrid terminal 100 according to the present invention. As illustrated in FIG. 3, in step 11, the hybrid terminal 100 is connected to the computer 200 through the USB data transmission cable 300. In steps 13 and 15, the common UMS 113 of the hybrid terminal 100 and the UMS 213 of the computer 200 detect connection with an external apparatus through the USB ports 150 and 230. In step 17, the common UMS 113 of the hybrid terminal 100 transmits memory classification information to the computer 200. In step 19, the computer 200 having received the memory classification information recognizes the hybrid terminal 100 as two removable disks, and displays a guidance screen as illustrated in FIG. 6. FIG. 6 illustrates the guidance screen displayed on the computer 200 according to the present invention. Referring to FIG. 6, the computer 200 recognizes the internal memory 220 of the computer 200 as a local disk, recognizes the first memory 120 and the second memory 140 of the hybrid terminal 100 as two removable disks, and displays the two removable disks as a removable disk (F) 203 and a removable disk (G) 205, as illustrated in the guidance screen 201. A user inputs a command for storing data stored in the computer 200 in one of the two removable disks with reference to the information of the guidance screen 201, or inputs a command for reading data stored in the two removable disks. Accordingly, in step 21, the computer 200 transmits data based on the command of the user to the hybrid terminal 100. After receiving the data, the hybrid terminal 100 processes the received data according to a series of processes.

The series of processes for processing the received data by the hybrid terminal 100 are illustrated in FIGS. 4 and 5. FIG. 4 is a flow diagram illustrating an operation of the hybrid terminal 100 for storing data received through the USB port 150 according to the present invention, and FIG. 5 is a flow diagram illustrating an operation of the hybrid terminal 100 for transmitting data to the computer 200 through the USB port 150 according to the present invention. Referring to FIG. 4, in step 31, the first CPU 110 of the hybrid terminal 100 receives a UMS packet through the USB port 150. In step 33, the first CPU 110 analyzes the received UMS packet. In step 35, the first CPU 110 detects target memory information, a storage request message, storage sector numbers, the number of storage sectors, and storage data from the UMS packet. In step 37, the first CPU 110 determines if a target memory corresponds to the first memory 120 through the target memory information. If the target memory corresponds to the first memory 120, step 39 is performed. However, if the target memory corresponds to the second memory 140, step 41 is performed. The target memory may be selected by a user. For example, the target memory may be determined according to whether a user has transmitted a data storage request to the removable disk (F) 203 or the removable disk (G) 205 with reference to the guidance screen 201 of FIG. 6. Returning to FIG. 4, in step 39, the first CPU 110 stores data in the first memory 120 according to the storage sector numbers and the number of storage sectors detected in step 35.

In step 41, the first CPU 110 transmits the storage request message, the storage sector numbers, the number of storage sectors, and the storage data to the second CPU 130 because the target memory corresponds to the second memory 140. After receiving the storage request message, the storage sector numbers, the number of storage sectors, and the storage data, the second CPU 130 stores data in the second memory 140 according to the storage sector numbers and the number of storage sectors, in step 43.

Hereinafter, an operation process of the hybrid terminal 100 for reading the data stored in the first memory 120 or the second memory 140 is described with reference to FIG. 5. In step 51, the first CPU 110 receives a UMS packet through the USB port 150. In step 53, the first CPU 110 analyzes the received UMS packet. In step 55, the first CPU 110 detects target memory information, a read request message, read sector numbers, and the number of read sectors from the UMS packet. In step 57, the first CPU 110 determines if a target memory corresponds to the first memory 120 or the second memory 140 with reference to the target memory information. If the target memory corresponds to the first memory 120, step 59 is performed. However, if the target memory corresponds to the second memory 140, step 63 is performed. In step 59, the first CPU 110 reads data from the first memory 120 according to the read sector numbers and the number of read sectors detected in step 55. Then, step 61 is performed.

In step 63, the first CPU 110 transmits the read request message, the read sector numbers, and the number of read sectors to the second CPU 130 because the target memory corresponds to the second memory 140. After receiving the read request message, the read sector numbers, and the number of read sectors, the second CPU 130 reads data from the second memory 140 according to the read sector numbers and the number of read sectors, in step 65. In step 67, the second CPU 130 transmits the read data to the first CPU 110. In step 61, the first CPU 110 packetizes the received data into a UMS packet, and transmits the UMS packet to the computer 200 through the USB port 150.

According to the present invention as described above, an external apparatus, for which a hybrid terminal including two CPUs and two memories corresponding to the two CPUs performs USB data transmission/reception, recognizes the two memories as two removable disks, and the hybrid terminal classifies the two memories and stores/reads data according to the request of the external apparatus, so that it is possible to efficiently use the memories of the hybrid terminal.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for USB data transmission in a hybrid terminal, the hybrid terminal including a first Central Processing Unit (CPU), a second CPU, a first independent memory, a second independent memory, and a Universal Serial Bus (USB) port, the first memory and the second memory corresponding to the first CPU and the second CPU, respectively, the method comprising the steps of:

when the first CPU detects connection with an external apparatus through the USB port, transmitting information for classifying the first memory and the second memory, by the first CPU, to the external apparatus;

analyzing, by the first CPU, data received through the USB port, and storing storage data in the first memory or reading data stored in the first memory and transmitting the read data to the external apparatus through the USB port according to information included in the data when a detected target memory corresponds to the first memory; and when the target memory corresponds to the second memory, transmitting, by the first CPU, the information included in the data to the second CPU, and storing, by the second CPU, the storage data in the second memory or reading data stored in the second memory and transmitting the read data to the external apparatus through the first CPU and the USB port according to the information included in the data.

2. A method for USB data transmission in a hybrid terminal, the hybrid terminal including a first Central Processing Unit (CPU), a second CPU, a first independent memory, a second independent memory, and a Universal Serial Bus (USB) port, the first memory and the second memory corresponding to the first CPU and the second CPU, respectively, the method comprising the steps of:

when the first CPU detects connection with an external apparatus through the USB port, transmitting information for classifying the first memory and the second memory, by the first CPU, to the external apparatus;

analyzing, by the first CPU, a random USB Mass Storage (UMS) packet received through the USB port, determining if the received UMS packet corresponds to a storage UMS packet or a read UMS packet, and determining a target memory;

when the received UMS packet corresponds to the storage UMS packet and the target memory corresponds to the first memory, storing, by the first CPU, detected data in the first memory according to storage information detected from the UMS packet;

when the received UMS packet corresponds to the storage UMS packet and the target memory corresponds to the second memory, transmitting, by the first CPU, storage information and data detected from the UMS packet to the second CPU;

storing, by the second CPU, the data in the second memory according to the storage information;

when the received UMS packet corresponds to the read UMS packet and the target memory corresponds to the first memory, reading, by the first CPU, data stored in the first memory according to read information detected from the UMS packet, packetizing the read data into a UMS packet, and transmitting the UMS packet to the external apparatus through the USB port;

when the received UMS packet corresponds to the read UMS packet and the target memory corresponds to the second memory, transmitting, by the first CPU, the read information detected from the UMS packet to the second CPU;

reading, by the second CPU, the data stored in the second memory according to the read information, and transmitting the read data to the first CPU; and packetizing, by the first CPU, the read data input from the second CPU into a UMS packet, and transmitting the UMS packet to the external apparatus through the USB port.

3. The method as claimed in claim 2, wherein the storage information includes storage sector numbers and a number of storage sectors, and the read information includes read sector numbers and a number of read sectors.

4. An apparatus for USB data transmission in a hybrid terminal, the hybrid terminal including a Universal Serial Bus (USB) port, a first Central Processing Unit (CPU), a second CPU, a first memory, and a second memory, the first memory and the second memory corresponding to the first CPU and the second CPU, respectively, the apparatus comprising:

the first CPU for detecting connection with an external apparatus through the USB port, transmitting information for classifying the first memory and the second memory to the external apparatus, analyzing data received through the USB port, storing storage data in the first memory or reading data stored in the first memory and transmitting the read data to the external apparatus through the USB port according to information included in the data when a detected target memory corresponds to the first memory, and outputting the data to the second CPU and transmitting read data input from the second CPU to the external apparatus through the USB port when the target memory corresponds to the second memory; and the second CPU for storing the storage data in the second memory or reading data stored in the second memory and outputting the read data to the first CPU according to the information included in the data.

5. An apparatus for USB data transmission in a hybrid terminal including a Universal Serial Bus (USB) port, the apparatus comprising:

a first memory;

a second memory;

a first Central Processing Unit (CPU) for detecting connection with an external apparatus through the USB port, transmitting information for classifying the first memory and the second memory to the external apparatus, analyzing a random USB Mass Storage (UMS) packet received through the USB port, storing storage data in the first memory according to storage information detected from the UMS packet when a target memory corresponds to the first memory, reading data stored in the first memory according to read information detected from the UMS packet, packetizing the read data into a UMS packet, transmitting the UMS packet to the external apparatus through the USB port, transmitting the storage information and the storage data to a second CPU when the target memory corresponds to the second memory, transmitting the read information to the second CPU, packetizing read data input from the second CPU into a UMS packet, and transmitting the UMS packet to the external apparatus through the USB port; and the second CPU for storing the storage data in the second memory according to the storage information input from the first CPU, and reading data stored in the second memory according to the read information and transmitting the read data to the first CPU.

6. The method as claimed in claim 5, wherein the storage information includes storage sector numbers and a number of storage sectors, and the read information includes read sector numbers and a number of read sectors.

7. An apparatus for USB data transmission in a hybrid terminal including a Universal Serial Bus (USB) port, the apparatus comprising:

a first memory;

a second memory;

a first block device driver for storing storage data in the first memory according to storage sector numbers and a number of storage sectors, and reading data stored in the first memory according to read sector numbers and a number of read sectors;

a USB Mass Storage (UMS) for detecting connection with an external apparatus through the USB port, transmitting information for classifying the first memory and the second memory to the external apparatus, analyzing an input UMS packet, outputting storage sector numbers, a number of storage sectors, storage data, read sector numbers, and a number of read sectors, which are detected from the UMS packet, to the first block device driver when a target memory corresponds to the first memory, outputting the storage sector numbers, the number of storage sectors, the storage data, the read sector numbers, and the number of read sectors to a host interface when the target memory corresponds to the second memory, packetizing data input from the first block device driver and the host interface into a UMS packet, and outputting the UMS packet;

a first Central Processing Unit (CPU) including a USB input/output unit for outputting a UMS packet input from the USB port to the UMS, and outputting a UMS packet input from the UMS to the USB port;

a second block device driver for storing storage data in the second memory according to storage sector numbers and a number of storage sectors input from the host interface, and reading data stored in the second memory according to read sector numbers and a number of read sectors; and a second CPU including the host interface for outputting the storage sector numbers, the number of storage sectors, the storage data, the read sector numbers, and the number of read sectors, which are input from the UMS, to the second block device driver, and outputting read data input from the second block device driver to the UMS.

8. A method for USB data transmission in a hybrid terminal, the hybrid terminal including a first Central Processing Unit (CPU), a second CPU, a first independent memory, a second independent memory, and a Universal Serial Bus (USB) port, the first memory and the second memory corresponding to the first CPU and the second CPU, respectively, the method comprising the steps of:

when connection with an external apparatus through the USB port is detected, transmitting information for classifying the first independent memory and the second independent memory to the external apparatus;

analyzing data received through the USB port, and determining a target memory and a data processing request; and processing by a CPU, which corresponds to the determined target memory, the received data according to the data processing request.

9. The method as claimed in claim 8, wherein the data processing request includes a data storage request and a data read request.

* * * * *